United States Patent
Kikuchi (10) Patent No.: US 10,780,709 B2
(45) Date of Patent: Sep. 22, 2020

(54) IMAGE FORMING APPARATUS

(71) Applicant: TOSHIBA TEC KABUSHIKI KAISHA, Shinagawa-ku, Tokyo (JP)

(72) Inventor: Kazuhiko Kikuchi, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/507,068

(22) Filed: Jul. 10, 2019

(65) Prior Publication Data
US 2020/0130373 A1     Apr. 30, 2020

(30) Foreign Application Priority Data

Oct. 24, 2018   (JP) ................ 2018-199934

(51) Int. Cl.
| | | |
|---|---|---|
| *B41J 2/355* | (2006.01) | |
| *B41J 3/36* | (2006.01) | |
| *B41J 2/335* | (2006.01) | |
| *G06F 3/12* | (2006.01) | |

(52) U.S. Cl.
CPC ........... *B41J 2/355* (2013.01); *B41J 2/33515* (2013.01); *B41J 3/36* (2013.01); *G06F 3/1278* (2013.01)

(58) Field of Classification Search
CPC .. G03G 15/065; G03G 15/80; G03G 15/5004; Y10T 307/406; H02J 9/005; H04L 12/10; H04N 1/00891; H04N 1/00896
USPC ............................................. 358/1.15, 1.14
See application file for complete search history.

(56) References Cited

U.S. PATENT DOCUMENTS

| | | | |
|---|---|---|---|
| 6,542,705 B2 | 4/2003 | Fujita et al. | |
| 8,019,247 B2 | 9/2011 | Mito et al. | |
| 8,774,666 B2 | 7/2014 | Saito et al. | |
| 9,294,646 B2 * | 3/2016 | Senba ................ | H04N 1/00496 |
| 9,419,434 B2 * | 8/2016 | Eguchi ..................... | G06F 1/26 |
| 2005/0231126 A1 * | 10/2005 | Nara .................. | G03G 15/5004 |
| | | | 315/210 |
| 2009/0067899 A1 * | 3/2009 | Kikuchi ............. | G03G 15/2053 |
| | | | 399/328 |
| 2011/0064445 A1 | 3/2011 | Yashiro | |
| 2011/0222933 A1 * | 9/2011 | Maruyama ......... | G03G 15/2042 |
| | | | 399/329 |
| 2012/0096294 A1 * | 4/2012 | Senba ..................... | G06F 1/263 |
| | | | 713/323 |

(Continued)

FOREIGN PATENT DOCUMENTS

| | | |
|---|---|---|
| JP | 2007-041275 | 2/2007 |
| JP | 2007-047556 | 2/2007 |

OTHER PUBLICATIONS

Extended European Search Report for European Patent Application No. 19190448.1 dated Mar. 30, 2020.

*Primary Examiner* — Negussie Worku (74) *Attorney, Agent, or Firm* — Amin, Turocy & Watson, LLP (57) ABSTRACT

According to one embodiment, an image forming apparatus includes a first heating unit, a second heating unit, and a print controller. The first heating unit includes a first heat source that generates heat with alternating current power. The second heating unit includes a second heat source that generates heat with direct current power. The print controller is configured to control printing using either the first heating unit or the second heating unit.

20 Claims, 7 Drawing Sheets

(56) References Cited

U.S. PATENT DOCUMENTS

| | | | |
|---|---|---|---|
| 2013/0051879 A1* | 2/2013 | Kikuchi | G03G 15/2053 399/331 |
| 2014/0314457 A1* | 10/2014 | Kikuchi | G03G 15/2053 399/329 |
| 2015/0261168 A1* | 9/2015 | Yokoyama | G03G 15/5004 399/81 |
| 2015/0371117 A1* | 12/2015 | Ooba | G06K 15/4055 358/1.15 |
| 2016/0011558 A1* | 1/2016 | Choho | G03G 15/80 399/88 |
| 2016/0116871 A1* | 4/2016 | Kikuchi | G03G 15/2053 399/329 |
| 2016/0139548 A1* | 5/2016 | Kosaka | G03G 15/2039 399/67 |
| 2017/0158448 A1* | 6/2017 | Suzuki | G03G 15/652 |
| 2017/0357204 A1* | 12/2017 | Nishihara | G03G 15/80 |
| 2018/0059587 A1* | 3/2018 | Sawada | G03G 15/2053 |
| 2018/0210381 A1* | 7/2018 | Kikuchi | G03G 15/2064 |
| 2018/0335821 A1* | 11/2018 | Kamiya | H04N 1/00244 |
| 2020/0064760 A1* | 2/2020 | Igarashi | G03G 15/2039 |

\* cited by examiner

IMAGE FORMING APPARATUS

CROSS-REFERENCE TO RELATED APPLICATION

This application is based upon and claims the benefit of priority from Japanese Patent Application No. 2018-199934, filed Oct. 24, 2018, the entire contents of which are incorporated herein by reference.

FIELD

Embodiments described herein relate generally to an image forming apparatus, a fixing system, and methods related thereto.

BACKGROUND

In the related art, in a fixing unit of an image forming apparatus, one heating element or a plurality of heating elements to which power is supplied from an alternating current power supply are used as a heat source. In a recent image forming apparatus, renewable energy can also be used to supply power to a heating element. However, when renewable energy is used to supply power to a heating element, it is necessary to convert direct current power into alternating current power. The conversion from direct current power into alternating current power is not suitable for energy-saving because the energy conversion efficiency is low.

DETAILED DESCRIPTION

Embodiments provide an image forming apparatus that can execute printing with low energy consumption.

In general, according to one embodiment, an image forming apparatus includes a first heating unit, a second heating unit, and a print controller. The first heating unit includes a first heat source that generates heat with alternating current power. The second heating unit includes a second heat source that generates heat with direct current power. The print controller is configured to control printing using either the first heating unit or the second heating unit.

Hereinafter, an image forming apparatus according to an embodiment will be described.

Figure 1:
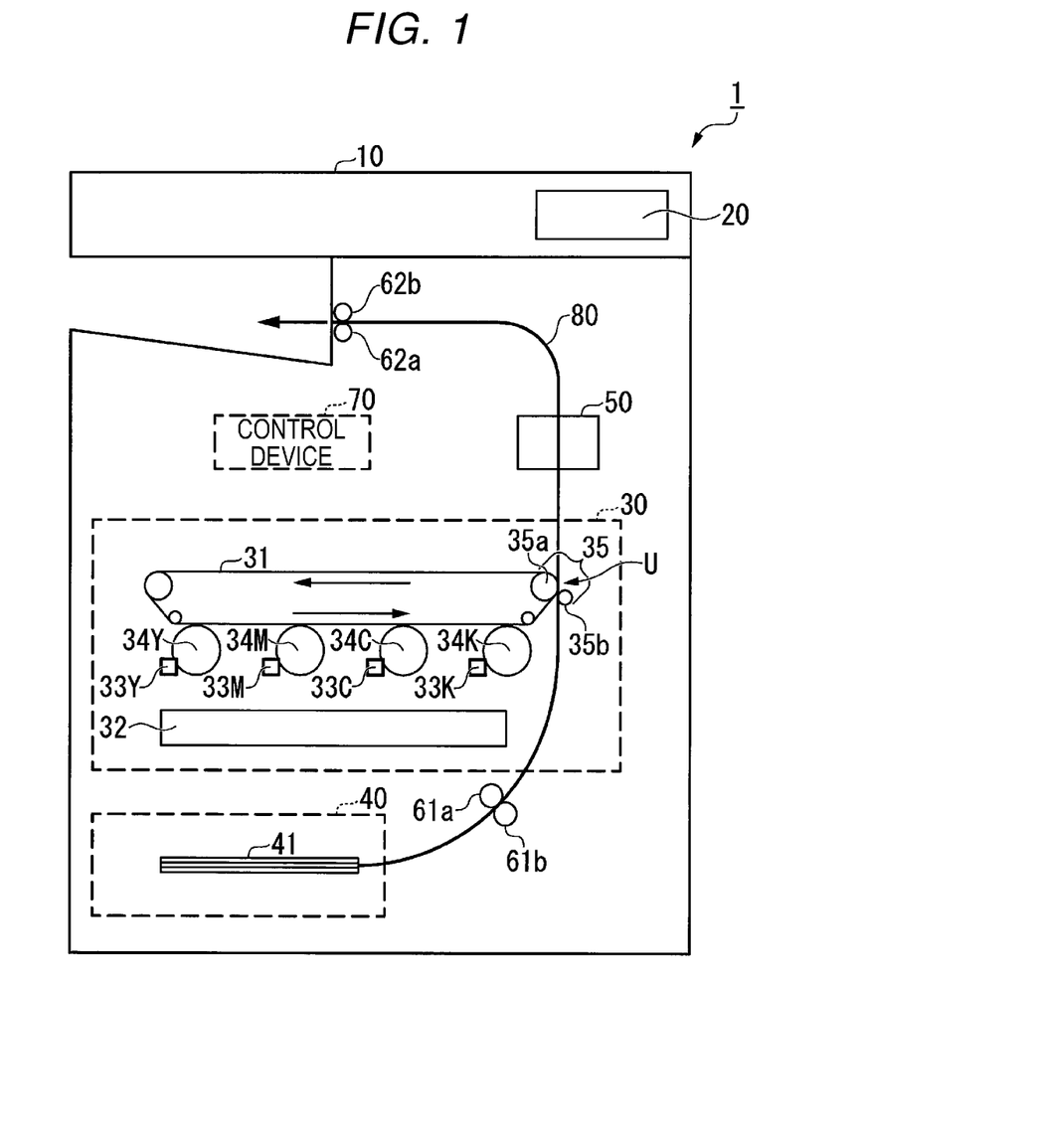
FIG. 1 is an exterior diagram illustrating an overall configuration example of an image forming apparatus according to an embodiment.

FIG. 1 is an exterior diagram illustrating an overall configuration example of the image forming apparatus according to the embodiment.

An image forming apparatus 1 according to the embodiment is, for example, multi-function peripheral (MFP). The image forming apparatus 1 executes an image forming process and an image fixing process. The image forming process is a process of forming an image on a sheet. The image fixing process is a process of fixing the image formed on the sheet. The sheet may be, for example, paper on which an original document, a character, an image, or the like is printed. The sheet may be any material as long as it is a material that can be read by the image forming apparatus 1. The image forming apparatus 1 reads an image formed on the sheet to generate digital data and generates an image file using the digital data.

The image forming apparatus 1 includes an image reading unit 10, a control panel 20, an image forming unit 30, a sheet accommodation unit 40, a fixing unit 50, conveying rollers 61a and 61b, paper discharge rollers 62a and 62b, and a control device 70.

The image reading unit 10 reads an image of a reading target in the form of brightness of light. For example, the image reading unit 10 reads an image that is printed on the sheet of the reading target set on an original document reading mount. The image reading unit 10 records the read image data. The recorded image data may be transmitted to another information processing apparatus through a network. Based on the recorded image data, the image forming unit 30 may form an image on the sheet.

The control panel 20 includes a display unit and an operation unit. The display unit is a display device such as a liquid crystal display or an organic electro luminescence (EL) display. The display unit displays various information relating to the image forming apparatus 1 according to the control of the control device 70. The operation unit includes a plurality of buttons and the like. The operation unit receives an operation of a user. The operation unit outputs a signal corresponding to the operation executed by the user to the control device 70. The display unit and the operation unit may be configured as an integrated touch panel.

The image forming unit 30 executes the image forming process. In the image forming process, the image forming unit 30 forms an image on the sheet based on image data generated by the image reading unit 10 or image data received through a communication path.

The image forming unit 30 includes a transfer belt 31, an exposure unit 32, a plurality of developing units 33 (developing units 33Y, 33M, 33C, and 33K), a plurality of photoconductive drums 34 (photoconductive drums 34Y, 34M, 34C, and 34K), and a transfer unit 35.

The transfer belt 31 is an intermediate transfer medium. The transfer belt 31 rotates in a direction (counterclockwise) indicated by an arrow along with the rotation of a roller.

The exposure unit 32 is provided at a position facing the photoconductive drums 34Y, 34M, 34C, and 34K of the respective developing units 33Y, 33M, 33C, and 33K. The exposure unit 32 irradiates a surface (photoreceptor layer) of each of the photoconductive drums 34Y, 34M, 34C, and 34K with laser light. The exposure unit 32 is controlled by the control device 70 to emit light based on the image data. The exposure unit 32 emits laser light based on the image data. Thus, negative charge on the surface (photoreceptor layer) of each of the photoconductive drums 34Y, 34M, 34C, and 34K is erased. As a result, an electrostatic pattern is formed at the position irradiated with laser light on the surface (photoreceptor layer) of each of the photoconductive drums 34Y, 34M, 34C, and 34K. That is, due to the irradiation of laser light by the exposure unit 32, an electrostatic latent image is formed on the surface (photoreceptor layer) of each of the photoconductive drums 34Y, 34M, 34C, and 34K. The exposure unit 32 may use light emitting diode (LED) light instead of laser light.

The developing unit 33Y, 33M, 33C, and 33K supplies toner to the photoconductive drums 34Y, 34M, 34C, and 34K. For example, the developing unit 33Y develops the electrostatic latent image on the surface (photoreceptor layer) of the photoconductive drum 34Y using yellow (Y) toner. The developing unit 33M develops the electrostatic latent image on the surface (photoreceptor layer) of the photoconductive drum 34M using magenta (M) toner. The developing unit 33C develops the electrostatic latent image on the surface (photoreceptor layer) of the photoconductive drum 34C using cyan (C) toner. The developing unit 33K develops the electrostatic latent image on the surface (photoreceptor layer) of the photoconductive drum 34K using black (K) toner.

The developing units 33Y, 33M, 33C, and 33K forms toner images as visible image on the photoconductive drums 34Y, 34M, 34C, and 34K. The toner images formed on the photoconductive drums 34Y, 34M, 34C, and 34K are transferred (primarily transferred) to the transfer belt 31.

The transfer unit 35 includes a support roller 35a and a secondary transfer roller 35b. The transfer unit 35 transfers the toner image on the transfer belt 31 to the sheet at a secondary transfer position U. The secondary transfer position U is a position where the support roller 35a and the secondary transfer roller 35b face each other with the transfer belt 31 interposed therebetween. The transfer unit 35 applies a transfer bias that is controlled by a transfer current to the transfer belt 31. The transfer unit 35 transfers the toner image on the transfer belt 31 to the sheet using the transfer bias. The control device 70 controls the transfer current used in a secondary transfer process.

The sheet accommodation unit 40 includes one paper feed cassette or a plurality of paper feed cassettes. The paper feed cassette accommodates a predetermined kind of sheet 41 having a predetermined size. The paper feed cassette includes a pickup roller. The pickup roller picks up the sheet 41 from the paper feed cassette one by one. The pickup roller supplies the picked sheet 41 to a conveying unit 80.

The fixing unit 50 executes the image fixing process. Specifically, the fixing unit 50 applies heat and pressure to the sheet 41 to fix the toner image to the sheet 41. The fixing unit 50 executes the image fixing process using either or both of alternating current power and direct current power. The alternating current power is supplied from a commercial power supply. The direct current power is supplied from a storage battery (not illustrated).

The conveying rollers 61a and 61b supply the sheet 41 fed from the paper feed cassette to the image forming unit 30. The conveying rollers 61a and 61b are provided at positions facing each other.

The paper discharge rollers 62a and 62b discharge the sheet 41 on which the image is formed by the fixing unit 50 to a discharge unit. The paper discharge rollers 62a and 62b are provided at positions facing each other.

The control device 70 controls each of the functional units of the image forming apparatus 1.

The conveying unit 80 conveys the sheet 41. The conveying unit 80 includes a conveyance path and a plurality of rollers (not illustrated). The conveyance path is a path through which the sheet 41 is conveyed. The rollers convey the sheet 41 by rotating according to the control of the control device 70.

Figure 2:
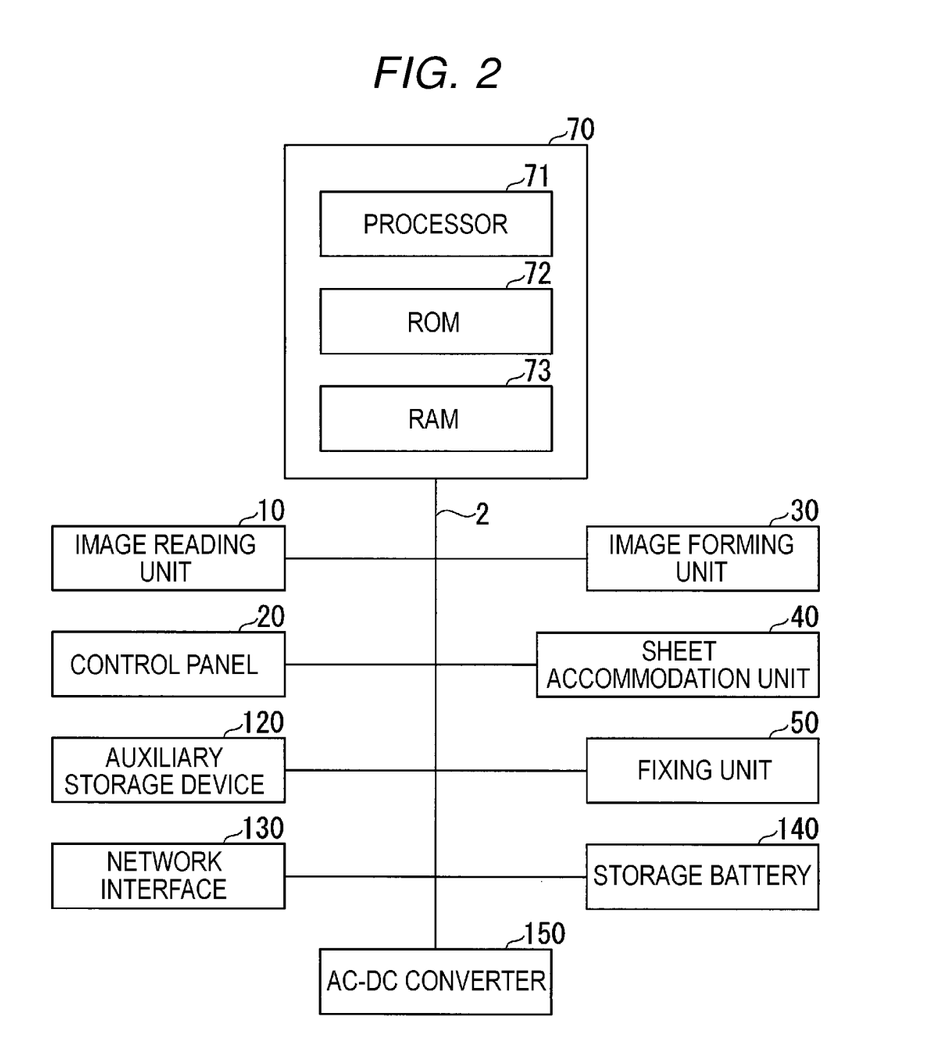
FIG. 2 is a block diagram illustrating a hardware configuration of the image forming apparatus.

FIG. 2 is a block diagram illustrating a hardware configuration of the image forming apparatus 1. FIG. 2 illustrates only a characteristic hardware configuration of the image forming apparatus 1 according to the embodiment.

The image forming apparatus 1 includes the image reading unit 10, the control panel 20, the image forming unit 30, the sheet accommodation unit 40, the fixing unit 50, the control device 70, an auxiliary storage device 120, a network interface 130, a storage battery 140, and an AC-DC converter 150. The respective functional units are connected to each other through a system bus 2 to be capable of data communication.

The description of the image reading unit 10, the control panel 20, the image forming unit 30, the sheet accommodation unit 40, and the fixing unit 50 is the same as described above and thus will not be repeated. Hereinafter, the control device 70, the auxiliary storage device 120, the network interface 130, the storage battery 140, and the AC-DC converter 150 will be described.

The control device 70 includes a processor 71, a read only memory (ROM) 72, and a random access memory (RAM) 73. The processor 71 is, for example, a central processing unit (CPU). The processor 71 executes various processes by loading a program stored in the ROM 72 to the RAM 73 and executing the loaded program. For example, the processor 71 executes the image fixing process by supplying either or both of alternating current power and direct current power to the fixing unit 50.

The ROM 72 stores a program for operating the processor 71. The RAM 73 temporarily stores data used in each of the functional units included in the image forming apparatus 1. The RAM 73 may store the digital data generated by the image reading unit 10. The RAM 73 may temporarily store a job and a job log.

The auxiliary storage device 120 is, for example, a hard disk or a solid state drive (SSD) and stores various data. The various data includes, for example, digital data, a job, and a job log.

The network interface 130 transmits and receives data to and from another apparatus. Here, the other apparatus is, for example, an information processing apparatus such as a personal computer, a tablet terminal, or a smartphone. The network interface 130 operates as an input interface and receives data or an instruction to be transmitted from the other apparatus. Examples of the instruction to be transmitted from the other apparatus include a print execution instruction. The network interface 130 operates as an output interface and transmits data to the other apparatus.

The storage battery 140 stores direct current power converted by the AC-DC converter 150. The storage battery 140 is a rechargeable secondary battery configured with a lithium ion and the like. The storage battery 140 supplies the stored power to the fixing unit 50 according to the control of the control device 70.

The AC-DC converter 150 converts alternating current power supplied from a commercial power supply into direct current power. The AC-DC converter 150 charges the storage battery 140 with direct current power.

Figure 3:
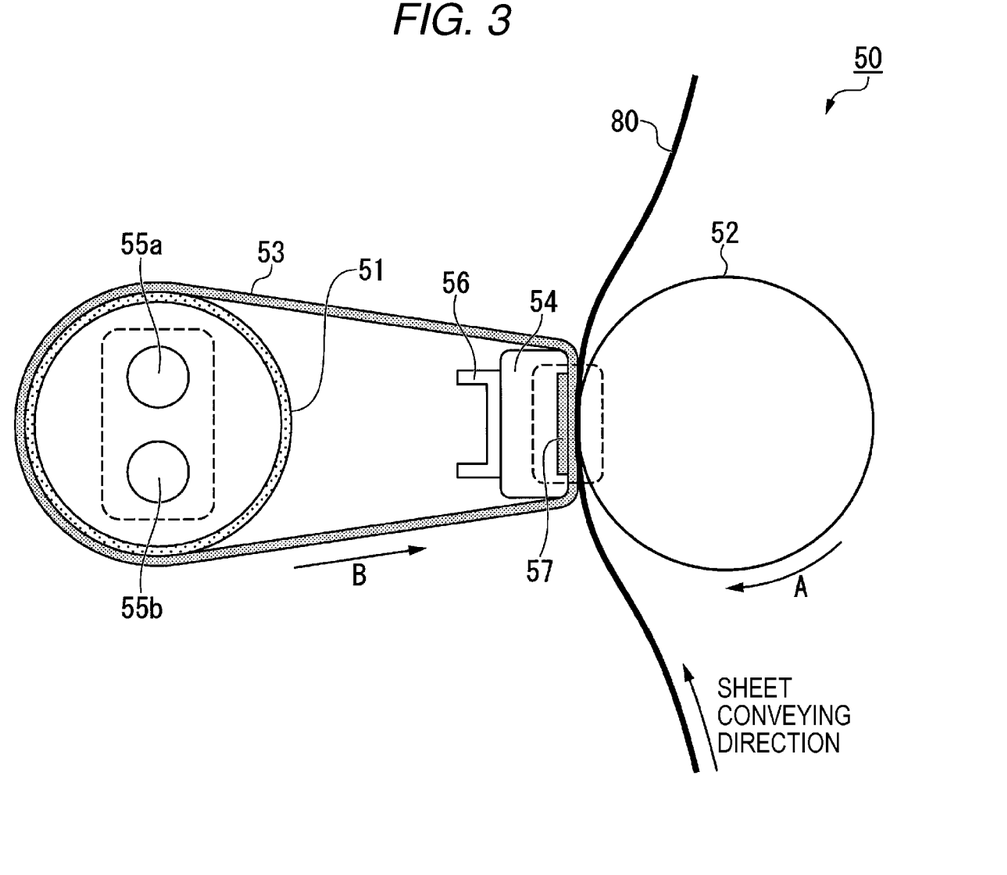
FIG. 3 is a diagram illustrating a specific configuration of a fixing unit.

FIG. 3 is a diagram illustrating a specific configuration of the fixing unit 50. FIG. 3 illustrates only a characteristic configuration of the fixing unit 50 according to the embodiment.

The fixing unit 50 includes a heating roller 51, a pressing roller 52, a fixing belt 53, and a fixing pad 54.

The heating roller 51 includes a plurality of first heat sources 55a and 55b. The first heat sources 55a and 55b are, for example, heater lamps including halogen lamps or induction heating (IH) heaters. The first heat sources 55a and 55b are turned on or off with or without energization from the control device 70. The heating roller 51 is warmed by heat generated when any one of the first heat sources 55a and 55b is energized.

As a material of the heating roller 51, a metal pipe formed of aluminum, iron, stainless steel, or the like can be used. In the embodiment, a case where the heating roller 51 is an aluminum pipe will be described as an example. In the heating roller 51, a black coating is formed to easily absorb radiant heat radiating from the first heat sources 55a and 55b. The heating roller 51 is configured with a hollow metal roller including the first heat sources 55a and 55b and heats the fixing belt 53 at a position where the fixing belt 53 is supported by the heating roller 51. In the vicinity of the heating roller 51, a temperature sensor that is in contact with the fixing belt 53 to detect the surface temperature or a power interrupting device is provided.

A heating region of the fixing belt 53 that is heated by the first heat source 55a is different from a heating region of the fixing belt 53 that is heated by the first heat source 55b. Specifically, the first heat source 55a heats a region having a first width from the center in a width direction of the fixing belt 53. The width direction of the fixing belt 53 is a direction perpendicular to a rotation direction (direction indicated by arrow B) of the fixing belt 53. The first heat source 55b heats an outer region in the width direction of the fixing belt 53. The heating roller 51 is an aspect of the first heating unit.

The first heat sources 55a and 55b are configured such that the output thereof is controlled by a power supply unit provided in the main body of the image forming apparatus 1 to generate heat. The output is controlled based on the detection result of the surface temperature of the fixing belt 53 detected by the temperature sensor (not illustrated). By controlling the output of the first heat sources 55a and 55b as described above, the temperature of the fixing belt 53 can be set to a desired fixing temperature. Alternating current power is supplied to the first heat sources 55a and 55b from a commercial power supply through the power supply unit.

The pressing roller 52 is set at a position facing the fixing pad 54. The pressing roller 52 is rotated by a motor in a direction indicated by arrow A. The pressing roller 52 nips the fixing belt 53 using a pressing lever or the like biased by a spring and presses the fixing belt 53 toward the fixing pad 54 side. An elastic layer of the pressing roller 52 is compressed and deformed such that a predetermined nip width is formed in a fixing nip. In the embodiment, for example, a nip pressure in the fixing nip is 100 N to 300 N on an A4-size sheet. For example, by moving the pressing lever, the nip pressure in the fixing nip can be reduced or can be made to be zero.

In the pressing roller 52, a hollow or solid metal roller, for example, a thermally stable elastic layer such as a silicone rubber layer is provided. A release layer formed of a PFA resin layer or a PTFE resin layer is provided on an outer surface of the pressing roller 52 to obtain release properties. The silicone rubber layer in the pressing roller 52 is preferably formed of solid rubber or foam sponge rubber.

When sponge rubber is used, thermal insulating properties are improved, and heat of the fixing belt 53 is not likely to be transferred to the pressing roller 52. Therefore, sponge rubber is desirable. A heat source that generates heat for heating the fixing nip may be provided in the pressing roller 52. In the embodiment, for example, the thickness of the silicone rubber layer of the pressing roller 52 is 5 mm and the nip width is 8 mm.

The fixing belt 53 is supported to be movable in a direction indicated by arrow B by the heating roller 51 and the fixing pad 54 that function as support members. The fixing nip is formed between the fixing pad 54 and the pressing roller 52 with the fixing belt 53 interposed therebetween. Due to pressure and heat in the fixing nip, the non-fixed toner image on the sheet that is passing through the fixing nip (between the fixing belt 53 and the pressing roller 52) can be thermally fused and fixed.

Although not illustrated in FIG. 3, a conveyance guide that guides the sheet to the fixing nip is arranged upstream of the fixing nip in a sheet conveying direction. A separating unit that separates the sheet and the fixing belt 53, a conveyance guide that guides the sheet to the paper discharge rollers 62a and 62b, or the like is arranged downstream of the fixing nip in the sheet conveying direction.

The fixing belt 53 is formed of either a resin material or a metal material. Examples of the resin material include polyimide, polyamide, and a fluororesin. Examples of the metal material include nickel and SUS. The fixing belt 53 is an endless belt or a film belt. A release layer may be formed on the surface layer of the fixing belt 53 such that the toner on the sheet is not attached to the fixing belt 53. For example, a release layer formed of a PFA resin layer or a PTFE resin layer may be formed on the surface layer of the fixing belt 53. An elastic layer such as a silicone rubber layer may be formed between the base and the surface layer of the fixing belt 53.

When the elastic layer such as a silicone rubber layer is not provided, the heat capacity is reduced, and fixing properties (temperature increasing properties) are improved. On the other hand, it is difficult to uniformly compress the non-fixed toner image, and there may be a problem in that a rough image corresponding to fine unevenness remains on the surface of the sheet during fixing. In order to solve this problem, it is preferable to provide an elastic layer having a thickness of 100 µm to 0.5 mm. Due to the deformation of the silicone rubber layer, the fine unevenness is absorbed, and the formation of the rough image is prevented. In the embodiment, for example, the fixing belt 53 includes a base that is formed of polyimide, a silicone rubber layer having a thickness of 200 µm, and a PFA tube coating having a thickness of 30 µm.

The fixing pad 54 is supported by a fixing stay 56 and is pressed against the pressing roller 52. The fixing pad 54 is formed of a heat-resistant resin. Examples of the heat-resistant resin include polyphenylene sulfide (PPS), polyether ether ketene (PEEK), and liquid crystal polymer (LCP). The fixing pad 54 is in contact with an inner circumferential surface of the fixing belt 53. The fixing pad 54 holds a second heating unit 57.

The second heating unit 57 includes a resistance heat generating layer that is formed on a base formed of a ceramic such as alumina or aluminum nitride or a metal such as SUS. The second heating unit 57 is in contact with the fixing belt 53 at a nip position so as to heat the fixing belt 53. The second heating unit 57 executes heating using direct current power stored in the storage battery 140. The second heating unit 57 may be configured to execute heating using direct current power supplied from natural energy such as sunlight or wind power.

Figure 4:
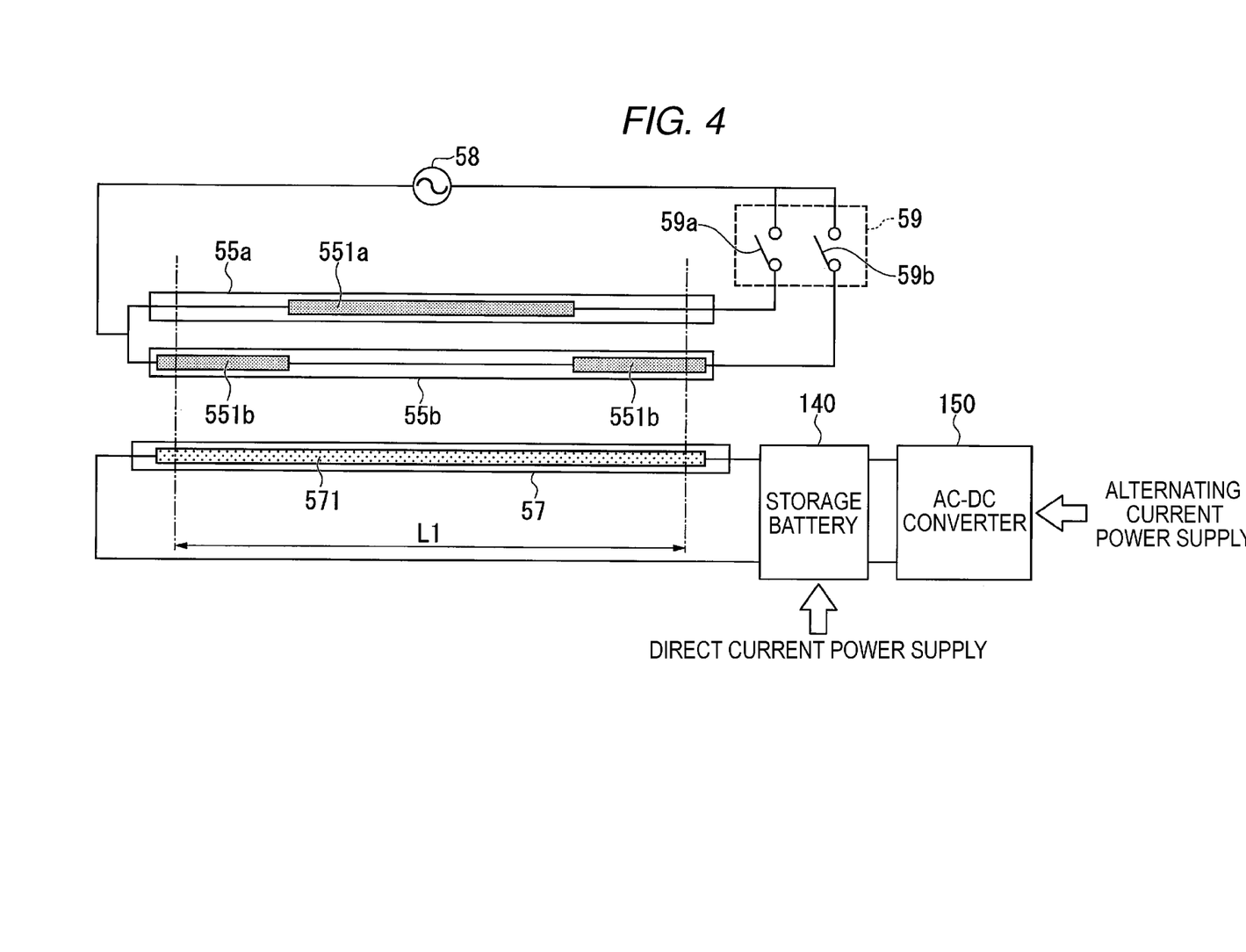
FIG. 4 is a diagram illustrating a more specific configuration of a plurality of heating units.

FIG. 4 is a diagram illustrating a more specific configuration of a plurality of heating units (the first heat sources 55a and 55b and the second heating unit 57).

As illustrated in FIG. 4, each of the first heat sources 55a and 55b is connected to a commercial power supply 58 through a switch 59. The switch 59 is configured with a first switch 59a and a second switch 59b. The first heat source 55a is connected to the commercial power supply 58 through the first switch 59a. The first heat source 55b is connected to the commercial power supply 58 through the second switch 59b. The switching control of the first switch 59a and the second switch 59b between an ON state and an OFF state is executed by the processor 71.

The storage battery 140 is connected to the second heating unit 57. The second heating unit 57 executes heating using direct current power stored in the storage battery 140. In addition to the second heating unit 57, the AC-DC converter 150 is connected to the storage battery 140. Direct current power converted by the AC-DC converter 150 is stored in the storage battery 140.

As illustrated in FIG. 4, a heating region 571 of the second heating unit 57 is wider than or equal to a width L1 of a maximum paper size. A heating region 551a of the first heat source 55a is narrower than the width L1 of the maximum paper size and is substantially equal to a predetermined size of a sheet (for example, a sheet having an A4 size or less). The first heat source 55b is used to heat a region that cannot be heated by the first heat source 55a. Therefore, a heating region 551b of the first heat source 55b is different from the heating region 551a of the first heat source 55a. By executing heating using the first heat source 55a and the first heat source 55b, a region that is wider than or equal to the width L1 of the maximum paper size can be heated.

Figure 5:
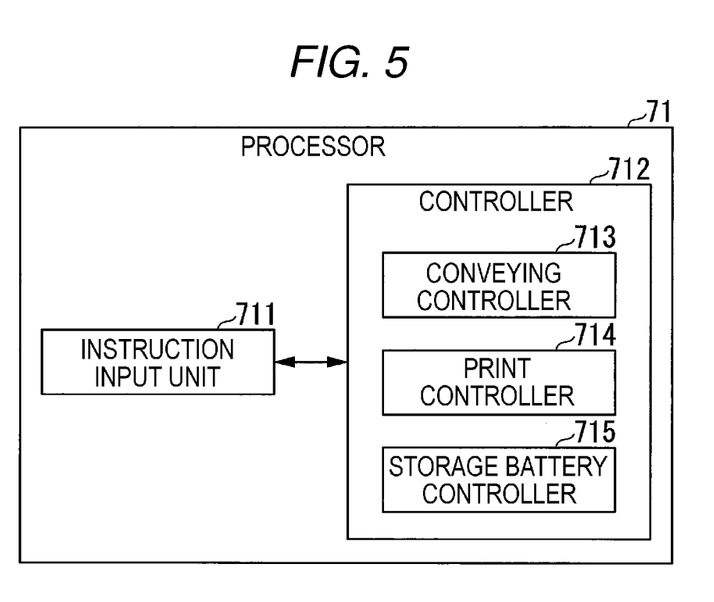
FIG. 5 is a schematic block diagram illustrating a functional configuration of a processor.

FIG. 5 is a schematic block diagram illustrating a functional configuration of the processor 71. The processor 71 includes an instruction input unit 711 and a controller 712.

The instruction input unit 711 inputs an input print execution instruction to the image forming apparatus 1.

The controller 712 includes a conveying controller 713, a print controller 714, and storage battery controller 715.

The conveying controller 713 controls the conveying of the sheet 41 by controlling various rollers. Specifically, the conveying controller 713 operates various rollers to convey the sheet 41 while the image forming process and the image fixing process are being executed. The conveying controller 713 stops the operations of various rollers to stop the conveying of the sheet 41 while the execution of the image forming process and the image fixing process is stopped.

The print controller 714 controls printing in the image forming process and the image fixing process. Specifically, the print controller 714 operates the image forming unit 30 and the fixing unit 50 to execute printing while the image forming process and the image fixing process are being executed. The print controller 714 executes the image fixing process using either or both of the first heat sources 55a and 55b and the second heating unit 57.

The storage battery controller 715 controls the charging of the storage battery 140 and the discharging from the storage battery 140. Specifically, when a first timing is reached, the storage battery controller 715 charges the storage battery 140. The first timing is a timing at which the image forming apparatus 1 starts the charging of the storage battery 140. For example, the first timing is a timing at which the printing process is not being executed, for example, a timing at which a sleep operation is being executed or a timing at which a specific night time zone is reached. When a second timing is reached, the storage battery controller 715 ends the charging of the storage battery 140. The second timing is a timing at which the image forming apparatus 1 ends the charging of the storage battery 140. For example, the second timing is a timing at which the storage battery 140 is charged in a predetermined amount or more or a timing at which a specific time zone is exceeded.

Figure 6:
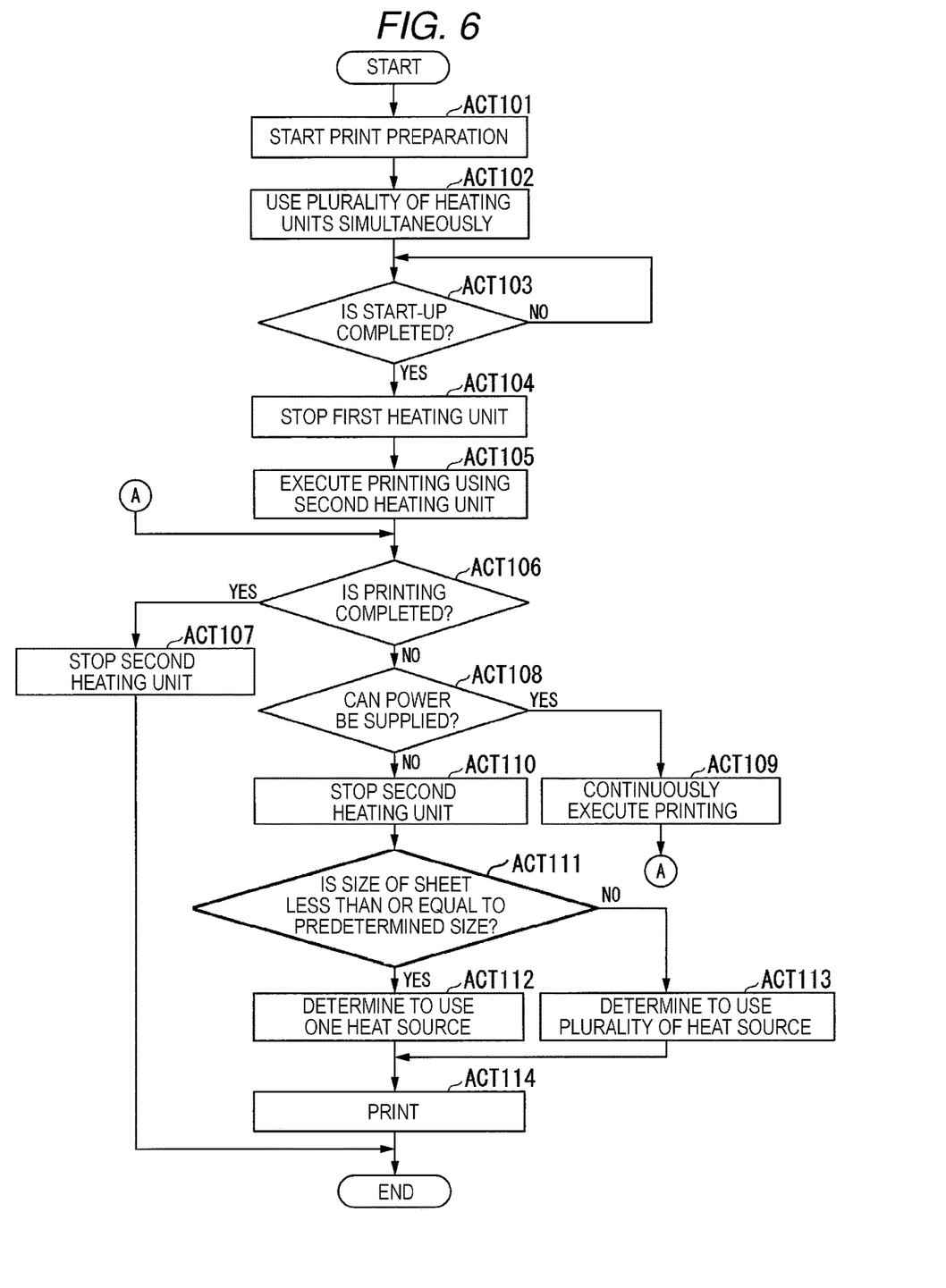
FIG. 6 is a flowchart illustrating a flow of a printing process that is executed by the image forming apparatus.

FIG. 6 is a flowchart illustrating a flow of a printing process that is executed by the image forming apparatus 1 according to the embodiment. The process of FIG. 6 is executed when the print execution instruction is input to the image forming apparatus 1. The print execution instruction includes a print start instruction, image data of a print target, and information regarding the size of a sheet.

The print controller 714 starts print preparation (ACT 101). Specifically, the print controller 714 wakes up the image forming apparatus 1 from a warm-up state or a sleep state. Next, the print controller 714 heats the fixing belt 53 simultaneously using a plurality of heating units (ACT 102). Specifically, the print controller 714 switches the states of the first switch 59a and the second switch 59b from an OFF state to an ON state. Thus, the first heat sources 55a and 55b are connected to the commercial power supply 58 such that power is supplied to the first heat sources 55a and 55b. As a result, the first heat sources 55a and 55b generate heat. The print controller 714 operates the storage battery controller 715 to supply direct current power stored in the storage battery 140 to the second heating unit 57 such that the second heating unit 57 generates heat.

The print controller 714 determines whether start-up is completed (ACT 103). When start-up is not completed (ACT 103: NO), the print controller 714 waits until start-up is completed.

On the other hand, when start-up is completed (ACT 103: YES), the print controller 714 stops the heat generation of the first heat sources 55a and 55b (ACT 104). Specifically, the print controller 714 switches the states of the first switch 59a and the second switch 59b from an ON state to an OFF state. As a result, the connection between the first heat sources 55a and 55b and the commercial power supply 58 is released such that power is not supplied to the first heat sources 55a and 55b. As a result, the heat generation of the first heat sources 55a and 55b is stopped.

The print controller 714 prints image data by operating the second heating unit 57 to heat the fixing belt 53 (ACT 105). The print controller 714 determines whether printing is completed (ACT 106). When printing is completed (ACT 106: YES), the print controller 714 stops the heat generation of the second heating unit 57 (ACT 107). Specifically, the print controller 714 operates the storage battery controller 715 to stop the supply of direct current power stored in the storage battery 140 such that the heat generation of the second heating unit 57 is stopped. Next, the image forming apparatus 1 ends the process of FIG. 6.

When printing is not completed in the process of ACT 106 (ACT 106: NO), the print controller 714 determines whether power can still be supplied to the second heating unit 57 (ACT 108). Specifically, when the remaining amount of direct current power stored in the storage battery 140 is an amount that can be used for printing remaining image data, the print controller 714 determines that power can be supplied. On the other hand, when the remaining amount of direct current power stored in the storage battery 140 is not an amount that can be used for printing remaining image data, the print controller 714 determines that power cannot be supplied.

When power can be supplied (ACT 108: YES), the print controller 714 continuously prints the remaining image data (ACT 109). For example, the print controller 714 prints the remaining image data by operating the second heating unit 57 to heat the fixing belt 53.

On the other hand, when power cannot be supplied (ACT 108: NO), the print controller 714 stops the heat generation of the second heating unit 57 (ACT 110). Next, the print controller 714 determines whether the size of a sheet to be printed is less than or equal to a predetermined size (for example, an A4 size) (ACT 111).

When the size of the sheet is less than or equal to the predetermined size (ACT 111: YES), the print controller 714 determines to execute printing using the first heat source 55*a* among the first heat sources 55*a* and 55*b* (ACT 112).

On the other hand, when the size of the sheet is greater than the predetermined size (ACT 111: NO), the print controller 714 determines to execute printing using both the first heat sources 55*a* and 55*b* (ACT 113). The print controller 714 prints the remaining image data using the determined heat source (ACT 114).

For example, when the print controller 714 determines to execute printing using the first heat source 55*a*, the print controller 714 switches the state of the first switch 59*a* from an OFF state to an ON state. Thus, the first heat sources 55*a* is connected to the commercial power supply 58 such that power is supplied to the first heat source 55*a*. As a result, the first heat source 55*a* generates heat. Since the first switch 59*b* is in the OFF state, power is not supplied to the first heat source 55*b*.

For example, when the print controller 714 determines to execute printing using both the first heat sources 55*a* and 55*b*, the print controller 714 switches the states of the first switch 59*a* and the second switch 59*b* from an OFF state to an ON state. Thus, the first heat sources 55*a* and 55*b* are connected to the commercial power supply 58 such that power is supplied to the first heat sources 55*a* and 55*b*. As a result, the first heat sources 55*a* and 55*b* generate heat. The print controller 714 operates the storage battery controller 715 to supply direct current power stored in the storage battery 140 to the second heating unit 57 such that the second heating unit 57 generates heat.

Figure 7:
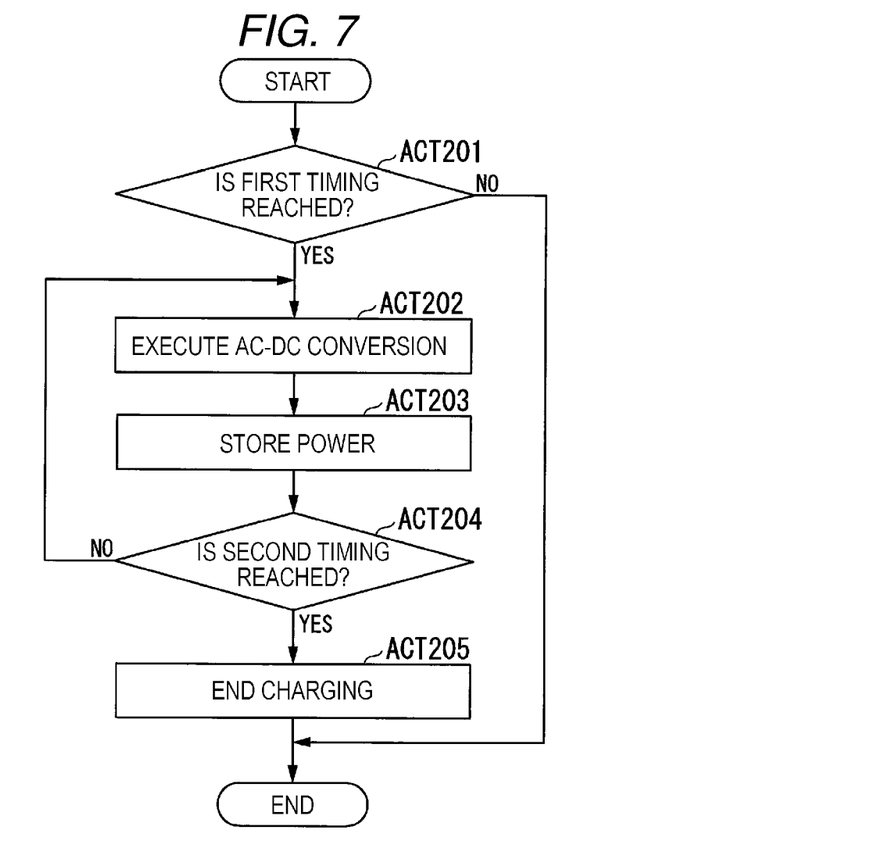
FIG. 7 is a flowchart illustrating a flow of a charging process that is executed by the image forming apparatus.

FIG. 7 is a flowchart illustrating a flow of a charging process that is executed by the image forming apparatus 1 according to the embodiment.

The storage battery controller 715 determines whether the first timing is reached (ACT 201).

When the first timing is not reached (ACT 201: NO), the image forming apparatus 1 ends the process of FIG. 7.

On the other hand, when the first timing is reached (ACT 201: YES), the storage battery controller 715 connects the commercial power supply 58 and the AC-DC converter 150 to each other. For example, the storage battery controller 715 connects the commercial power supply 58 and the AC-DC converter 150 to each other by switching the state of a switch (not illustrated) to an ON state. As a result, alternating current power supplied from the commercial power supply 58 flows into the AC-DC converter 150. The AC-DC converter 150 converts alternating current power supplied from the commercial power supply 58 into direct current power. Next, the AC-DC converter 150 charges the storage battery 140 by charging the storage battery 140 with the converted direct current power (ACT 203).

The storage battery controller 715 determines whether the second timing is reached (ACT 204).

When the second timing is not reached (ACT 204: NO), the image forming apparatus 1 repeatedly executes the process after ACT 202.

On the other hand, when the second timing is reached (ACT 204: YES), the storage battery controller 715 ends the charging of the storage battery 140 (ACT 205). Specifically, the storage battery controller 715 releases the connection between the commercial power supply 58 and the AC-DC converter 150 by switching the state of a switch (not illustrated) to an OFF state. As a result, alternating current power supplied from the commercial power supply 58 does not flow into the AC-DC converter 150. Therefore, the storage battery 140 is not charged with power.

The image forming apparatus 1 having the above-described configuration can execute printing with low energy consumption. Specifically, during the execution of printing, the image forming apparatus 1 executes printing using either the first heating units including the first heat sources 55*a* and 55*b* or the second heating unit 57. The second heating unit 57 generates heat using direct current power stored in the storage battery. Accordingly, it is not necessary to convert direct current power into alternating current power for use, and direct current power can be used as it is. Therefore, printing can be executed with low energy consumption.

The image forming apparatus 1 preferentially uses the second heating unit 57 during printing and, when power supplied to the second heating unit 57 is insufficient, can execute printing using the first heating unit. As a result, the use of alternating current power supplied from the commercial power supply 58 can be reduced. Therefore, printing can be executed with low energy consumption.

When printing is executed on a sheet having a size that is less than or equal to a predetermined size using the first heating unit, the image forming apparatus 1 executes printing using only the first heat source 55*a*. As a result, it is not necessary to supply power to both the first heat sources 55*a* and 55*b*. Therefore, power cost can be reduced.

During start-up such as wake-up from a warm-up state or a sleep state, the image forming apparatus 1 heats the fixing belt 53 using both the first heating unit and the second heating unit 57. As a result, the start-up time can be reduced.

Hereinafter, a modification example of the image forming apparatus 1 will be described.

The position of the second heating unit 57 is not necessarily limited to the position facing the pressing roller 52. For example, the position of the second heating unit 57 is not particularly limited as long as it is a position that is different from the position of the heating roller 51 and where the fixing belt 53 can be heated.

The number of the first heat sources is not necessarily two and may be three or more. When the heating region of the first heat source is variable, a single first heat source may be provided. The heating region being variable represents that, for example, the first heat source is configured with a plurality of heating elements and the heating elements can selectively generate heat.

In the fixing unit 50 according to each of the embodiments, a method of heating a toner image through a film-shaped member to be fixed to paper may also be adopted.

With the image forming apparatus 1 according to any one of the above-described embodiments, printing can be executed with low energy consumption.

Other than in the operating examples, if any, or where otherwise indicated, all numbers, values and/or expressions referring to parameters, measurements, conditions, etc., used in the specification and claims are to be understood as modified in all instances by the term "about."

Each of the functions of the image forming apparatus 1 in the embodiment may be implemented by a computer. In this case, the function may be realized by recording a program for implementing this function in a computer-readable recording medium and causing a computer system to read the program recorded in the recording medium and to execute the read program. The definition of "computer system" described herein includes an OS and hardware such as a peripheral. "Computer-readable recording medium" refers to a storage device, for example, a portable medium such as a flexible disk, a magneto-optic disk, a ROM, or a CD-ROM or a hard disk built into a computer system. "Computer-readable recording medium" may also refer to a medium that dynamically stores a program for a short period of time like a communication line when a program is transmitted through a network such as the Internet or a communication line such as a telephone line or refer to a medium that stores a program for a certain period of time like a volatile memory in a computer system functioning as a server or a client. The program may implement some of the above-described functions or may implement the above-described function in combination with a program recorded in a computer system in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
 a fixing unit that comprises:
  a first heater comprising a first heat source that generates heat based on receiving alternating current power;
  a second heater comprising a second heat source that generates heat based on receiving direct current power; and
 a print controller configured to execute printing using the first heater, the second heater, or both the first heater and the second heater.

2. The apparatus according to claim 1, wherein
the print controller defaults to use the second heater during printing.

3. The apparatus according to claim 2, wherein
when a necessary amount of power is not being supplied to the second heater, the print controller controls the first heater and the second heater such that power supply to the second heater is stopped and the first heater is used.

4. The apparatus according to claim 1, wherein
the first heater comprises a plurality of first heat sources having different heating regions, and
the print controller supplies power to one first heat source or a plurality of first heat sources according to a size of a sheet as a print target.

5. The apparatus according to claim 4, wherein
when the size of the sheet as the print target is less than or equal to a predetermined size, the print controller supplies power to one first heat source, and
when the size of the sheet as the print target is greater than the predetermined size, the print controller supplies power to a plurality of first heat sources.

6. The apparatus according to claim 1, wherein
the alternating current power is a commercial power supply.

7. The apparatus according to claim 1, wherein
the direct current power is a rechargeable battery.

8. The apparatus according to claim 7, wherein
the rechargeable battery is configured to be charged by the alternating current power.

9. The apparatus according to claim 1, wherein
the first heater comprises at least one of halogen lamps and induction heating heaters.

10. The apparatus according to claim 1, wherein
The second heater comprises a resistance heat generating layer.

11. The apparatus according to claim 1, wherein
the print controller is further configured to stop using at least one of the first heater and the second heater when printing is completed.

12. The apparatus according to claim 1, wherein
the print controller is further configured to use the second heater upon completion of start-up.

13. The apparatus according to claim 1, wherein
the print controller is further configured to use the first heater if start-up is not completed.

14. A method of operating an image forming apparatus, comprising:
 supplying an alternating current power and a direct current power to a fixing unit that comprises a first heater and a second heater, the first heater comprising a first heat source, the second heater comprising a second heat source;
 a print controller configured to executing printing using at least one of:
  the first heat source that generates heat based on supply of the alternating current power, and
  the second heat source that generates heat based on supply of the direct current power.

15. The method according to claim 14, wherein
when the second heater does not receive a supply of a necessary amount of power, the method comprising:
 using the first heater; and
 stopping use of the second heater.

16. The method according to claim 14, further comprising:
 charging a rechargeable battery using the alternating current power, and
 using the rechargeable battery to executing printing.

17. The method according to claim 14, further comprising:
 stopping use of the at least one of the first heater and the second heater when printing is completed.

18. The method according to claim 14, further comprising:
 using the second heater upon completion of start-up.

19. The method according to claim 14, further comprising:
 using the first heater if start-up is not completed.

20. A fixing system for use in an image forming apparatus, comprising:
 a fixing unit comprising:
  a first heater comprising a first heat source that uses alternating current power to generate heat;
  a second heater comprising a second heat source that uses direct current power to generate generates heat; and
 a print controller configured to execute printing using the first heater, the second heater, or both the first heater and the second heater.

* * * * *